United States Patent
Zeira et al.

(10) Patent No.: US 7,068,626 B2
(45) Date of Patent: Jun. 27, 2006

(54) METHOD OF USING A MOBILE UNIT TO AUTONOMOUSLY DETERMINE A SERVING CELL

(75) Inventors: Eldad Zeira, Huntington, NY (US); Ariela Zeira, Huntingon, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/216,120

(22) Filed: Aug. 9, 2002

(65) Prior Publication Data

US 2003/0086394 A1 May 8, 2003

Related U.S. Application Data

(60) Provisional application No. 60/312,821, filed on Aug. 16, 2001.

(51) Int. Cl.
*H04Q 7/22* (2006.01)

(52) U.S. Cl. ............... 370/332; 370/345; 455/439

(58) Field of Classification Search ............ 370/280, 370/277, 294, 331, 332, 345; 455/436, 437, 455/439, 560
See application file for complete search history.

(56) References Cited

U.S. PATENT DOCUMENTS 5,159,593 A * 10/1992 D'Amico et al. .......... 370/332
5,752,190 A * 5/1998 Kaewell et al. ............ 455/436
6,041,235 A * 3/2000 Aalto ........................ 455/437
6,144,861 A 11/2000 Sundelin et al.
6,363,252 B1 * 3/2002 Hamalainen et al. ....... 455/436

FOREIGN PATENT DOCUMENTS

WO   WO 9638997 A1 * 12/1996
WO      9914972       3/1999
WO   WO 9959368 A1 * 11/1999

* cited by examiner

*Primary Examiner*—Hassan Kizou
*Assistant Examiner*—Dmitry Levitan
(74) *Attorney, Agent, or Firm*—Volpe and Koenig, P.C.

(57) ABSTRACT

A time division duplex method for determining whether to initiate handover of a mobile unit from a serving base station to a target base station, the method comprises receiving the broadcast channel from the serving base station ($BCH_{ser}$); calculating the serving base station received signal code power ($RSCP_{ser}$); receiving the broadcast channel from the target base station ($BCH_{tar}$); calculating the target base station received signal code power ($RSCP_{tar}$); determining interference signal code power for the serving base station ($ISCP_{ser}$); determining interference signal code power for the target base station ($ISCP_{tar}$); calculating $RSCP_{ser}/ISCP_{ser}$; calculating $RSCP_{tar}/ISCP_{tar}$; and determining whether $RSCP_{ser}/ISCP_{ser}$ is less than $RSCP_{tar}/ISCP_{tar}$, and if so, commencing handover from the serving base station to the target base station.

8 Claims, 3 Drawing Sheets

METHOD OF USING A MOBILE UNIT TO AUTONOMOUSLY DETERMINE A SERVING CELL

CROSS REFERENCE TO RELATED APPLICATION

This application priority from U.S. Provisional Patent Application Serial No. 60/312,821 filed Aug. 16, 2001, which is incorporated by reference as if fully set forth.

BACKGROUND

The present invention generally relates to code division multiple access (CDMA) communication systems employing time division duplex (TDD). More specifically, the present invention is a TDD system which implements a novel method for handing over a mobile terminal between two base stations.

A Universal Mobile Telecommunications System (UMTS) network architecture as shown in FIG. 1 includes a core network (CN), a UMTS Terrestrial Radio Access Network (UTRAN) and a User Equipment (UE). The two general interfaces are the Iu interface, which is coupled between the UTRAN and the core network, and the radio interface Uu, which is coupled between the UTRAN and the UE. The UTRAN consists of several Radio Network Subsystems (RNS). They can be interconnected by the Iur interface. This interconnection allows core network independent procedures between different RNSs. The RNS is further divided into the Radio Network Controller (RNC) and several base stations (Node-Bs). The base stations are connected to the RNC by the Iub interface. One base station can serve one or multiple cells, and typically serves a plurality of UEs. Although the UTRAN supports both FDD mode and TDD mode on the radio interface, the present invention is related only to the TDD mode.

In the current UMTS TDD systems, the sole criterion for handover, whether intra- or inter-frequency, is the path loss difference between the present base station, (i.e. the "serving" base station), and a target base station. This situation is shown in FIG. 2. The mobile user equipment (UE) is shown receiving signals from two base stations: 1) the serving base station $BS_{ser}$; and 2) the target base station $BS_{tar}$. The UE receives the physical channel that carries the broadcast channel $BCH_{ser}$ from the serving base station $BS_{ser}$ and the physical channel that carries the broadcast channel $BCH_{tar}$ from the target base station $BS_{tar}$. The UE measures the strength of the channels $BCH_{ser}$, $BCH_{tar}$. When the $BCH_{tar}$ from the target cell is sufficiently stronger than the channel $BCH_{ser}$ from the serving cell, the measurements are transmitted to the RNC, which determines whether or not to initiate a handover. Alternatively, measurements can periodically be signaled to the RNC for the purpose.

The current procedure 10 carried out by a prior art UMTS TDD communication system for determining whether to commence handover can be generally explained with reference to FIG. 3. The UE receives the physical channel that carries the broadcast channel ($BCH_{ser}$) from the serving base station $BS_{ser}$ (step 12) and calculates its strength. The UE also receives the physical channel that carries the broadcast channel ($BCH_{tar}$) from the target base station $BS_{tar}$ (step 16) and also calculates its strength. Periodically, or depending on the relative signal strengths, the information is signaled to the RNC which determines the $BCH_{ser}$ path loss (step 14) and the $BCH_{tar}$ path loss (step 18).

It is then determined whether the $BCH_{ser}$ path loss is greater than the $BCH_{tar}$ pathloss (step 20). If it is not, no further action is taken. If, however, the $BCH_{ser}$ path loss is greater than the $BCH_{tar}$ path loss as determined by step 20, the handover to the target base station $BS_{tar}$ (step 22) is typically commenced.

Typically, the values measured at steps 12 and 16 are transmitted to the RNC, and steps 14, 18 and 20 are performed at the RNC.

Although this example illustrates a single target cell, the same is true for a multiple of target cells of which the UE is aware, either by detecting their presence or by having received their parameters from the serving cell.

In TDD systems that use multi-user detecting (MUD) receivers, the interference measured in the serving cell is different from other cells. A prerequisite to receiving data in any cell is the ability to decode the BCH channel in the cell. Due to the low spreading factor used in TDD this may be difficult, particularly at cell edge. Therefore it would be desirable to ensure that BCH reception is possible in the target cell prior to the handover.

In addition to the path loss, BCH reception depends on the interference in the slot and prior knowledge of its level is necessary to determine its likelihood. This is particularly true in small cells where the interference level is typically higher, and the interference is also different from cell to cell and UE to UE. Observing the interference in the serving cell will typically provide no information about the interference in the target cell because in the case of a MUD receiver, different slots or different frequencies may be used. Thus it would be desirable to measure the interference in the slot which carries the BCH in the target cell.

SUMMARY

The present invention is a TDD system which utilizes a new criteria and method for initiating handover between cells. The system measures the downlink interference in the BCH timeslot, and utilizes this interference in conjunction with the signal strength as criterion for the handover decision. The new criterion may be used instead of, or in addition to, existing criteria.

Accordingly, the ratio of the signal strength of the BCH to the interference in the timeslot may be used to make the handover decision. In one embodiment of the present invention, the signal strength is used in macro cells where interference is relatively predictable and BCH reception is easy. The ratio of signal strength to the interference may be used in pico cells and micro cells.

An advantage of using both signal strength and interference measured in the same slot as handover criterion is the inherent inaccuracy of each of the measurements that results from a use of an inaccurate automatic gain control (AGC) circuit. As both signal level and interference are determined at once, their ratio is more accurate than each alone.

BRIEF DESCRIPTION OF THE DRAWING(S)

DETAILED DESCRIPTION OF THE PREFERRED EMBODIMENT(S)

Figure 1:
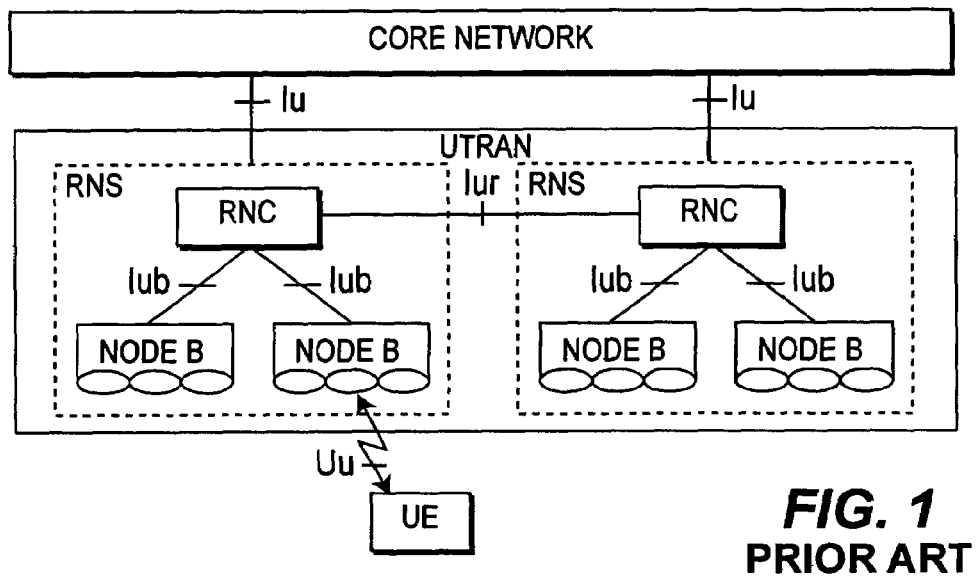
FIG. 1 is a prior art UTMS system.
Figure 2:
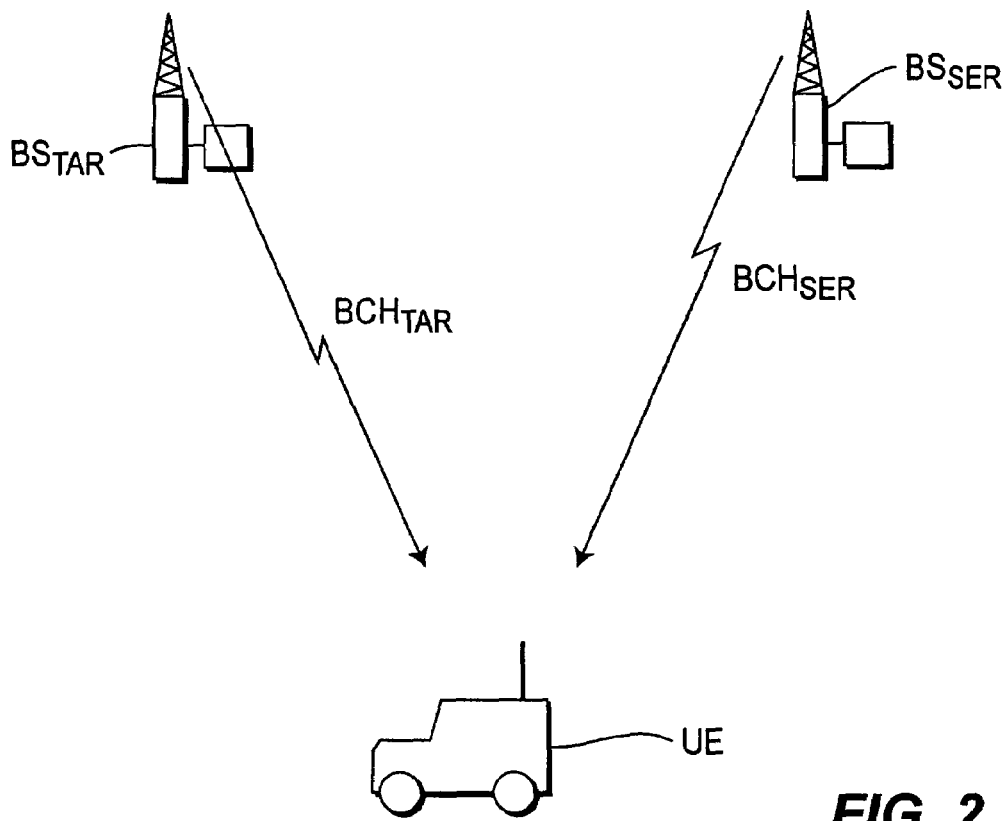
FIG. 2 is a prior art UE receiving the broadcast channel from two base stations.
Figure 3:
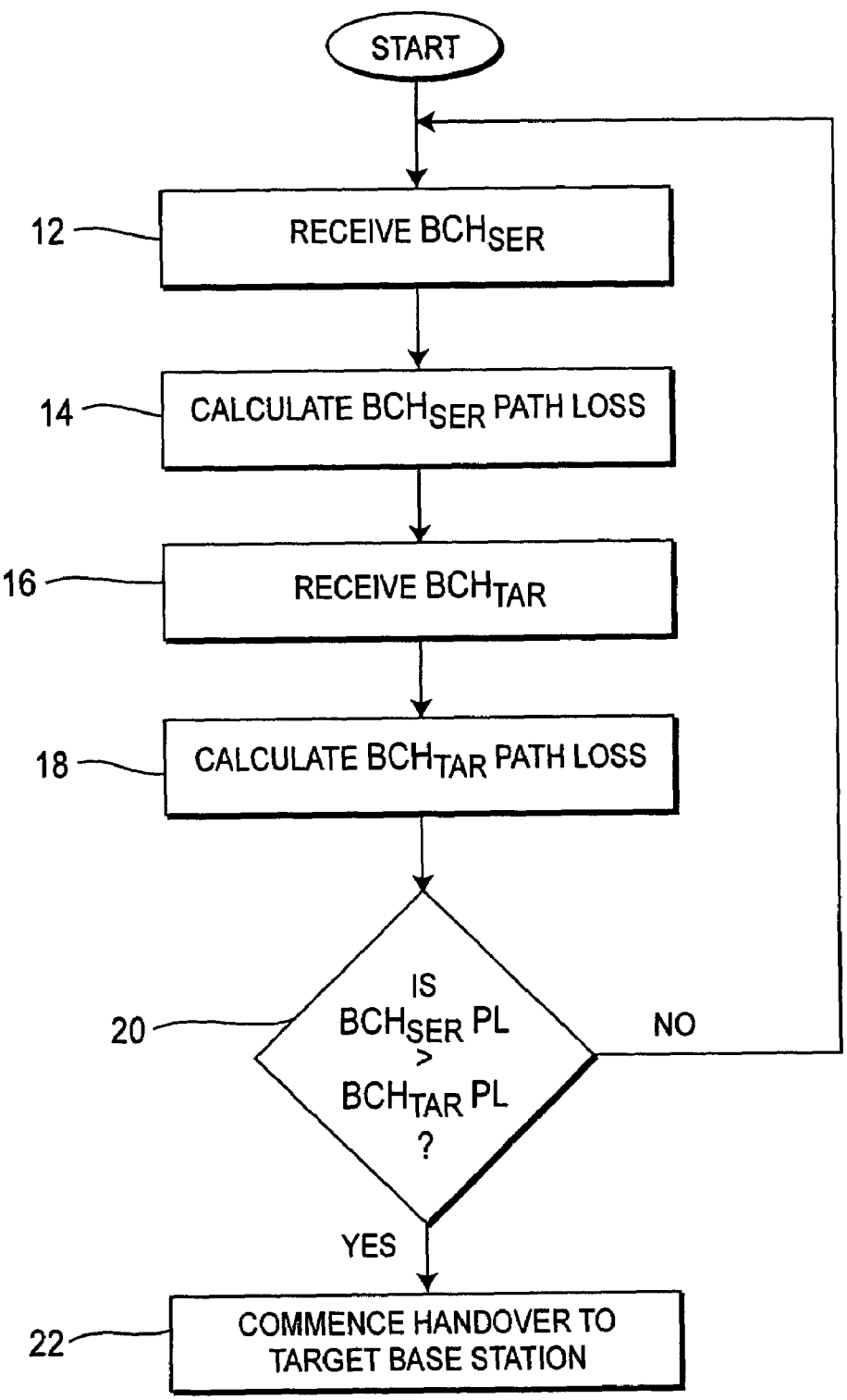
FIG. 3 is the procedure carried out by a prior art UMTS TDD communication system for determining whether to commence handover.

The present invention will be described with reference to the drawing figures where like numerals represent like elements throughout.

In the following detailed description RSCP refers to the downlink (DL) reception strength of the broadcast channel (BCH), which is a measure of the path loss. ISCP refers to the DL interference in the same slot as observed by the UE receiver.

In some operating states the mobile decides autonomously on its serving cell, called autonomous cell selection. The present invention applies to both network controlled handover and autonomous cell selection.

Figure 4:
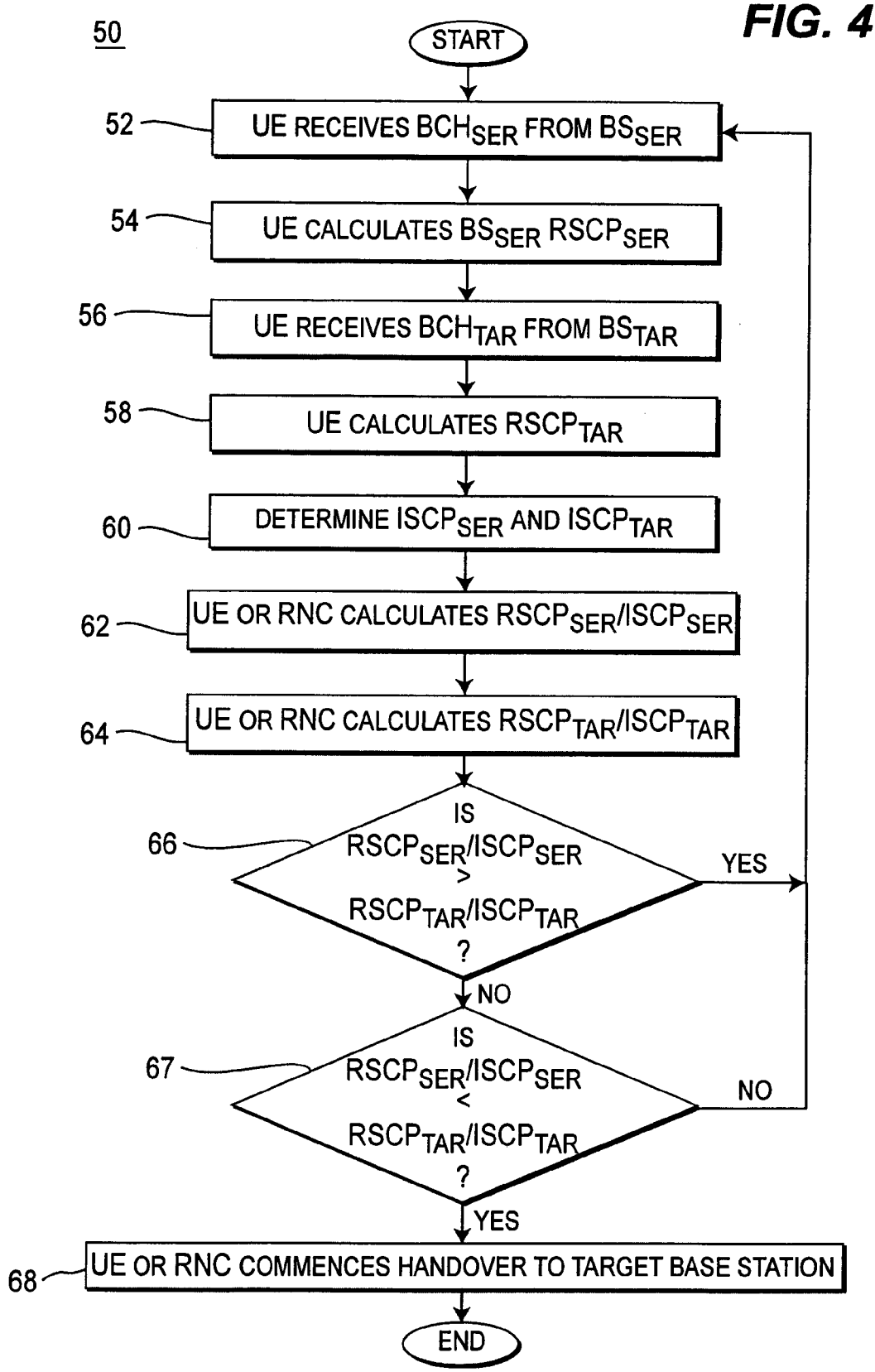
FIG. 4 is a method for determining whether to institute handover in accordance with the present invention.

Referring to the flow diagram of FIG. 4, a method for determining whether to institute handover in accordance with the present invention is shown. The UE first receives the broadcast channel ($BCH_{ser}$) from the serving base station $BS_{ser}$ (step 52) and calculates the serving base station $RSCP_{ser}$ (step 54). The UE also receives the broadcast channel $BCH_{tar}$ from the target base station $BS_{tar}$ (step 56) and calculates the target base station $RSCP_{tar}$ (step 58). The ISCP is then determined for both cells $ISCP_{ser}$, $ISCP_{tar}$ (step 60). It should be noted that separate ISCP measurements are needed even if both cells share the same carrier and slot. The $RSCP_{ser}/ISCP_{ser}$ for the serving base station $BS_{ser}$ is calculated (step 62), and the $RSCP_{tar}/ISCP_{tar}$ for the target base station is calculated (step 64). If the $RSCP_{ser}/ISCP_{ser}$ for the serving base station $BS_{ser}$ is greater than the $RSCP_{tar}/ISCP_{tar}$ for the target base station $BS_{tar}$ (step 66), then the UE maintains communications with the serving base station $BS_{ser}$. If, however, the $RSCP_{ser}/ISCP_{ser}$ for the serving base station $BS_{ser}$ is less than the $RSCP_{tar}/ISCP_{tar}$ for the target base station $BS_{tar}$ (step 67), the procedure for handing over to the target base station $BS_{tar}$ (step 68) is commenced.

It should be noted that steps 62–68 are typically performed at the RNC. In that case, the UE would forward the ISCP and RSCP measurements to the serving base station $BS_{ser}$, which would then perform the calculation steps 62 and 64, comparison step 66 and the remaining commencement of handover to the target base station $BS_{tar}$ of step 68. Alternatively, the UE may perform steps 62–66, and step 68 would comprise sending a message to the RNC to initiate handover in accordance with prior art handover methods. It is intended that the present invention operate with both the UE performing steps 62–68 or the RNC performing steps 62–68.

It should be noted that there are many different types of handover procedures that can be used in accordance with the present invention, and it is beyond the scope of the present invention to provide a detailed explanation of such procedures. However, the present invention provides a new "prehandover" method for evaluating whether or not to commence handover.

It should be noted that this method applies to serving and target BCHs which are either in the same or different timeslots, or the same or different frequencies.

What is claimed is:

1. In a multi-cell communication system, a method of using a mobile unit to autonomously determine whether or not to initiate handover of the mobile unit from a serving base station located in a first cell of the communication system to a target base station located in a second cell of the communication system, the method comprising:

(a) the mobile unit receiving a first broadcast channel from the serving base station;

(b) the mobile unit autonomously determining the serving base station received signal code power ($RSCP_{ser}$);

(c) the mobile unit receiving a second broadcast channel from the target base station;

(d) the mobile unit autonomously determining the target base station received signal code power ($RSCP_{tar}$);

(e) the mobile unit autonomously determining the first cell interference signal code power ($ISCP_{ser}$);

(f) the mobile unit autonomously determining the second cell interference signal code power ($ISCP_{tar}$);

(g) the mobile unit forwarding to the serving base station the signal code powers autonomously determined by the mobile unit in steps (b), (d), (e) and (f);

(h) the serving base station determining a first signal code power ratio ($RSCP_{ser}/ISCP_{ser}$) for the serving base station by dividing the serving base station received signal code power ($RSCP_{ser}$) by the first cell interference signal code power ($ISCP_{ser}$);

(i) the serving base station determining a second signal code power ratio ($RSCP_{tar}/ISCP_{tar}$) for the target base station by dividing the target base station received signal code power ($RSCP_{tar}$) by the second cell interference signal code power ($ISCP_{tar}$);

(j) the serving base station comparing the first signal power ratio with the second signal power ratio; and (k) if the first signal power ratio is less than the second signal power ratio, the serving base station initiating the handover of the mobile unit from the serving base station to the target base station.

2. The method of claim 1 wherein both of said base stations are associated with a common radio network controller (RNC).

3. The method of claim 1 wherein the communication system is a time division duplex (TDD) system.

4. The method of claim 1 wherein the communication system further includes at least one radio network controller (RNC) in communication with the serving base station, and the serving base station initiates the handover by sending a signal to the RNC, the signal including a message requesting initialization of the handover.

5. In a multi-cell communication system, a method of using a mobile unit to autonomously determine whether or not to initiate handover of the mobile unit from a serving base station located in a first cell of the communication system to a target base station located in a second cell of the communication system, the method comprising:

(a) the mobile unit autonomously determining the serving base station received signal code power ($RSCP_{ser}$) and the first cell interference signal code power ($ISCP_{ser}$);

(b) the mobile unit autonomously determining the target base station received signal code power ($RSCP_{tar}$) and the second cell interference signal code power ($ISCP_{tar}$);

(c) the mobile unit forwarding to the serving base station the signal code powers autonomously determined by the mobile unit in steps (a) and (b);

(d) the serving base station determining a first signal code power ratio ($RSCP_{ser}/ISCP_{ser}$) for the serving base station by dividing the serving base station received signal code power ($RSCP_{ser}$) by the first cell interference signal code power ($ISCP_{ser}$);

(e) the serving base station determining a second signal code power ratio ($RSCP_{tar}/ISCP_{tar}$) for the target base station by dividing the target base station received signal code power ($RSCP_{tar}$) by the second cell interference signal code power ($ISCP_{tar}$);

(f) the serving base station comparing the first signal power ratio with the second signal power ratio; and (g) if the first signal power ratio is less than the second signal power ratio, the serving base station initiating the handover of the mobile unit from the serving base station to the target base station.

6. The method of claim 5 wherein both of said base stations are associated with a common radio network controller (RNC).

7. The method of claim 5 wherein the communication system is a time division duplex (TDD) system.

8. The method of claim 5 wherein the communication system further includes at least one radio network controller (RNC) in communication with the serving base station, and the serving base station initiates the handover by sending a signal to the RNC, the signal including a message requesting initialization of the handover.

* * * * *